3,380,887
USE OF BUTYROLACTAM FOR TREATING
MOTION SICKNESS
Corneliu Giurgea, Brussels, Belgium, assignor to UCB
(Union Chimique-Chemische Bedrijven), S.A., Brussels,
Belgium
No Drawing. Filed Aug. 3, 1965, Ser. No. 477,014
Claims priority, application Great Britain, Aug. 6, 1964,
32,038/64
5 Claims. (Cl. 167—65)

ABSTRACT OF THE DISCLOSURE

Gamma-butyrolactam is particularly useful in relieving motion sickness in one suffering from such sickness.

---

The present invention relates to the use of γ-butyrolactam as drugs for the treatment of motion sickness, i.e. the well-known disease occasionally suffered by passengers on boats, airplanes, trains and the like.

The present invention also relates to new pharmaceutical compositions prepared from the said lactam.

The so-called "central nystagamus" tests (J. Lachmann et al., Amer. J. Physiol. 193, (1958), 328–34; F. Bergmann et al., Amer. J. Physiol. 197, (1959, No. 2), 454–60) has been used by W. J. Oosterveld (Thesis Amsterdam, Drukkerij Van Wijk, Oostzaan, 1963, p. 59) and by C. Giurgea et al. (Medicina Experimentalis, 9, (1963), 361–70) as a pharmacological test for the activity of drugs useful in the treatment of motion sickness. Hitherto, these drugs have been either antihistamine agents or anticholinergic (atropinic) substances. Their use is, however, limited because of their side effects, such as somnolence (in the case of the antihistamine products), dryness of the mouth and visual disorders (in the case of the anticholinergic substances).

Pharmacological studies which I have carried out relating to central nystagmus have established that the antihistamine property and the anticholinergic property are neither necessary nor sufficient to give a positive test of central nystagmus. Indeed, certain powerful antihistamine drugs, such as promethazine, do not block central nystagmus and, on the other hand, compounds such as meclizine do block central nystagmus, although possessing no anticholinergic activity. From this observation, I have concluded that a positive central nystagmus test is neither related to antihistamine activity nor to antichlorinergic activity.

According to the present invention, I have found that γ-butyrolactam has in the central nystagmus test, an activity which is at least as great as that of the most active known antihistamine and/or antichlorinergic drugs and that, consequently, it is very useful in the treatment of motion sickness.

Gamma-butyrolactam (or 2-pyrrolidone) has hitherto not been used in either human or veterinary medicine and it is, therefore, novel to use it in the treatment of motion sickness of man and animals.

The activity of the γ-butyrolactam appears to be connected with the presence of the lactam grouping in the molecule; 3-pyrrolidone, which is an isomer of 2-pyrrolidone (or gamma-butyrolactam) has, in fact, no activity whatsoever in respect of central nystagmus.

In camparison with the antihistamine and anticholinergic drugs previously used for the treatment of motion sickness, the γ-butyloctam of the present invention offers the following important advantages:

(a) A markedly superior therapeutic index because, for a substantially equal activity, its toxicity is considerably lower;
(b) Absence of antihistamine action;
(c) Absence of anticholinergic (atropinic) action;
(d) No somnolence is induced.

These various advantages are clearly shown by the following pharmacological test:

Central nystagmus test

Experiments are carried out on rabbits of both sexes, weighing 2.5 to 3 kg. An electrode is grafted in the thalamic reticular substance of the rabbit according to the coordinates of the Monnier and Gangloff Atlas ("Atlas for stereotaxic brain research on the conscious rabbit," Elsevier, Amsterdam (1960), pp. 41 et seq.).

In order to test a compound, the threshold of excitability is established for determined stimulation parameters (voltage and frequency). The duration of the stimulation is 1 minute and the stimulation is repeated every 3 minutes up to the end of the test. Hereinbelow, the term "nystagmus" will be used to designate the number of eye-beats during the period of electrical stimulation of 1 minute and the term "after-nystagmus" to indicate the number of eye-beats after the end of the electrical stimulation.

The compound is administered intravenously, while maintaining the rhythm of stimulation described above, and the effect of the compound on nystagmus is observed. There is considered to be a decrease of nystagmus and/or of after-nystagmus when at least 2 to 3 times successively the number of eye-beats decreases by at least 50 to 60% of the control and that there is suppression of nystagmus and/or of after nystagmus when the stimulation no longer produces eye-beats. On the other hand, there is an increase of nystagmus if the number of eye-beats is increased by at least 125% (at least 2 to 3 times successively).

The comparative tests relate to the following compounds:
 (1) 2-pyrrolidone (gamma-butyrolactam) a compound according to the present invention,
 (2) Delta-valerolactam,
 (3) Epsilon-caprolactam,
 (4) 3-pyrrolidone hydrochloride, an isomer of 2-pyrrolidone,
 (5) Gamma-aminobutyric acid, of which 2-pyrrolidone is the lactam,
 (6) 1-benzhydryl-4 - [2 - (2 - hydroxyethoxy)ethyl]-piperazine dihydrochloride,
 (7) Diphenhydramine, i.e. 2-(diphenylmethoxy)-N,N-dimethylethylamine,
 (8) Promethazine, i.e. 10-(2 - dimethylaminopropyl)-phenothiazine,
 (9) Scopolamine hydrobromide.

Compound (6) is an antihistamine drug, the activity of which, in respect of motion sickness, has been established by C. Giurgea et al. (loc. cit.). Compounds (7), (8) and (9) are known antihistamine and/or anticholinergic substances which are also used in the treatment of motion sickness.

In the following table, the first column indicates the compound tested, the second column the dose in mg./kg. body weight and the third and fourth columns, respectively, the activity on nystagmus and after-nystagmus.

Symbols used: $s$=suppressed; $i$=inactive; $a$=increased.

| Compound | Dose | Nystagmus | After-Nystagmus |
|---|---|---|---|
| (1) | 2 | s | s |
| (2) | 10 | i | i |
|  | 50 | s | s |
| (3) | 10 | s | s |
| (4) | 10 | i | i |
|  | 50 | i | i |
| (5) |  | 2–50 unstable and irregular effects | |
| (6) | 2 | s | s |
| (7) | 2 | s | s |
| (8) | 2 | i | a |
|  | 4 | i | a |
| (9) | 2 | s | s |

This table shows that the activity of 2-pyrrolidone (compound (1)) is substantially as great as that of compounds (6), (7) and (9) at present used for the treatment of motion sickness, and that the compounds (2) and (3) are also found to be active, although to a lesser extent than compound (1). Gamma-aminobutyric acid (compound (5)) gives unstable and irregular effects, which is certainly due to the difficulty of reaching the brain. On the other hand, 3 - pyrrolidone (compound (4)), which is an isomer of 2-pyrrolidone, but which is not related to gamma-aminobutyric acid, has no activity at all on nystagmus.

Promethazine (compound (8)), which does not suppress central nystagmus, has little value in the treatment of motion sickness.

Toxicity

The determination of the lethal dose L.D. 50 in the rat and/or mouse has given the following results, administration being intravenous, except in the case of compound (9), which was administered subcutaneously:

| Compound | Animal | L.D. 50 (mg./kg.) |
|---|---|---|
| (1) | Rat | >7,200 |
| (2) | Rat | >3,000 |
|  | Mouse | <6,000 >2,000 |
| (3) | Mouse | 650 |
| (4) | Rat | <600 |
| (5) | Rat | >5,000 |
| (6) | Rat | 41 |
|  | Mouse | 40 |
| (7) | Mouse | 27 |
| (8) | Rat | 50 |
| (9) | Rat | 296 |

It can be seen that the lactam of the present invention (compound (1)) is much less toxic than the compounds at present used for the treatment of motion sickness (compounds (6) to (9)) and that their therapeutic index is, therefore, about 100 times higher.

Influence on the behavior of the mouse

This is determined in accordance with the Irwin test (Gordon Research Conference on Medicinal Chemistry at Colby Junior College, New London, August 1959). In this method, progressive doses (in mg./kg.) of the compound to be studied are administered intraperitoneally to groups of three male mice weighing between 18 and 22 g. and all the changes of behavior shown by the animals are examined. The results obtained are shown in the following table.

| Compound | Behavior Normal | More active | Less active | Observations |
|---|---|---|---|---|
| (1) | + |  |  | Nothing special up to 1,500 mg./kg. |
| (2) | + |  |  | Do. |
| (3) |  |  | + | Convulsions at 678 mg./kg. Stereotypy at 335 mg./kg. |
| (4) |  |  | + | Edema of paws and snout at 1,215 mg./kg. |
| (5) |  | + |  | Exophthalmos at 100 mg./kg. |
| (6) |  |  | +− | Mydriasis and exothalmos at 34 mg./kg. |
| (7) |  | + |  | Mydriasis, exophthalmos and tremor at 10 mg./kg. |
| (8) |  |  | + | Mydriasis and tremor at 100 mg./kg. |
| (9) | 1 + | 2 + |  | Mydriasis at 1 mg./kg., Excitation at 3 mg./kg., Stereotypy at 30 mg./kg. |

[1] At low dosages.
[2] At high dosages.

Thus, it can be seen that the compound (1) in doses of up to 1500 mg./kg. does not produce any change in the behavior of the mouse.

Antihistamine activity

Use is made of the D. Bovet and A. M. Staub test (C.r. Soc. Biol. 124, (1937), (547–549) slightly modified by S. Levis et al. (Arch. Interm. Pharmacodyn. 109 (1957), 128–29).

This test is based on the neutralization of intravenous toxic doses of histamine in the guinea-pig by the previous administration of the test compound at a dose of 2.5 mg./kg. body weight. The number of toxic doses of histamine is determined which are neutralized immediately (zero time) and one hour after the injection of the test compound. The results obtained are shown in the following table:

DOSES OF HISTAMINE NEUTRALIZED

| Compound | Zero time | After one hour |
|---|---|---|
| (1) | Below 2 | Below 2 |
| (2) | Below 2 | Below 2 |
| (3) | Below 2 | Below 2 |
| (4) | Below 5 | Below 5 |
| (5) | Below 5 | Below 5 |
| (6) | 10 | 800 |
| (7) | 25 | Below 25 |
| (8) | 60 | 800 |
| (9) | Below 2 | Below 2 |

This table shows that the compound of the present invention has no antihistamine properties.

Mydriatic (atropinic) action in the mouse

The method of A. R. Ing, J. S. Dawes and L. Wajda (J. Pharm. and Exp. Ther. 85 (1954), 88) is used.

This test permits evaluation of atropinic activity in vivo in the mouse. It consists in determining the intravenous doses of each compound in mg./kg. body weight which bring the diameter of the pupil to 1.1 mm.

The table below indicates the results obtained.

| Compound: | Mydriasis |
|---|---|
| (1) | above 200 |
| (2) | above 200 |
| (3) | above 200 |
| (4) | above 200 |
| (5) | above 200 |
| (6) | above 20 |
| (7) | 6 |
| (8) | 5 |
| (9) | 0.013 |

The compound of the present invention has, therefore, no mydriatic action, unlike compounds (6), (7), (8) and (9).

Electroencephalogram

For the determination of the tranquilizing and soporific properties of the compounds tested, use is made of the method described by C. Giurgea and F. Moeyersoons (Med. Exptl. 8 (1963, No. 2), 66–73). The test animal is the rabbit and the compounds are administered intravenously in quantities expressed in mg./kg. body weight. Compound (4) was not tested because of its inactivity in the central nystagmus test. The results obtained are shown in the following table:

In the "Observations" column the terms "spindles," "slow waves" and "crises" have the following meanings:

Spindles.—Bioelectric waves collected at brain level, of a mean frequency of 15–20 c./second and of relatively high amplitude ranging up to several hundred microvolts. This amplitude is increasing and then decreasing, putting in mind the shape of a spindle, from which comes its name.

Slow waves.—Waves which have a reduced frequency of one to three v./sec. A series of slow waves, whether or not interrupted by spindles, is a sign of tranquilization or sleep.

Crisis.—An epileptic crisis consisting of a series of sharp-pointed and regular waves of high amplitude.

| Compound | Quantity administered | Observations |
|---|---|---|
| (1) | 1–100 | Normal. |
|  | 300 | Slight tranquilization. |
| (2) | 30–100 | Normal. |
|  | 300 | Normal to constant activation. |
| (3) | 30 | Normal. |
|  | 100 | Irritation. |
| (5) | 10–300 | Normal. |
| (6) | 1–3 | Do. |
|  | 5–10 | Tranquilization, arousing reaction to sound: negative. |
|  | 10–15 | Tranquilization mixed with irritation, sometimes with crises. |
|  | 20 | Crises. |
| (7) | 0.5–1 | Tranquilization. |
|  | 3–5 | Tranquilization plus irritation. |
|  | 7.5 | Irritation. |
|  | 10 | Crises. |
| (8) | 0.5 | Normal. |
|  | 1 | Normal to light sleep. |
|  | 3–15 | Deep sleep, arousing reaction to sound: negative. |
|  | 20 | Crises. |
|  | 30 | Do. |
| (9) | 0.5 | Spindles plus slow waves. |
|  | 1 | Spindles plus slow waves; arousing reaction to sound: negative. |
|  | 10–30 | Spindles plus slow waves; arousing reaction to sound: decreased to negative during 2 hours, electroencephalogram-behavior dissociation. |

This shows that the compound of the present invention does not induce sleep, unlike compounds (6), (7), (8) and (9).

The test described by L. Ectors and J. Achslogh (Revue Neurologique, 81 (1949, No. 10), 805–827) has been used to study the activity of the lactam according to the present invention in the treatment of epilepsy. In this test, the application of a blotting-paper dipped in a solution of the sodium salt of penicillin (40.000 I.U. per milliliter) on the sensory-motor cortex of the unanesthetized rabbit, causes permanently the appearance of epileptic crises.

It has been found in ten rabbits, that the intravenous injection of 200 mg./kg. of 2-pyrrolidone prevents in all of the animals tested the generalization of focal epilepsy.

The compound of the present invention in its use for the treatment of motion sickness, may be administered orally, parenterally (for example by intravenous injections) or rectally, in view of its easy absorption, its solubility and the fact that it has no local irritating action.

According to the invention, I therefore provide also a new composition suitable for the treatment of motion sickness, in man and animals which comprises gamma-butyrolactam, as active therapeutic ingredient and pharmaceutical excipient known for the production of formulations suitable for oral, parenteral or rectal administration.

Compositions suitable for oral administration may be solid or liquid and are the known pharmaceutical forms for such administration, such as for example tablets, pills, lozenges, gelatin capsules, solutions, syrups, and the like.

Compositions suitable for parenteral administration are the known pharmaceutical forms for such administration, for example sterile aqueous or oily solutions, suspensions or emulsions. For administration by rectal route, the compositions of the invention are generally in the form of suppositories.

The pharmaceutical forms such as injectable solutions, injectable suspensions, tablets, drops, suppositories are prepared according to pharmacist's art. The active therapeutic lactam according to the invention is mixed with a solid or liquid non-toxic pharmaceutical carrier and optionally with dispersing agents, lubricating agents, disintegrating agents, stabilizing agents, and so on. There may be added preservatives and conventional flavoring and coloring agents.

Such solid and liquid pharmaceutical carriers are also well known in the art. As solid pharmaceutical excipients for the production of tablets or capsules, there may be mentioned for example starch, talc, calcium carbonate, lactose, sucrose, magnesium stearate.

The percentage of active therapeutic agent in the pharmaceutical compositions may be varied within wide limits depending on the conditions of use, particularly on the frequency of administration.

The physician will indicate daily dosage of the therapeutic agents of this invention. Practically, the posology will be ranging from 100 to 2,000 mg. of active therapeutic agent per day.

The compositions of the invention may for example be administered orally in a dosage of 1 to 4 tablets or capsules per day containing each 100, 200, 400 or 500 mg. of the instant therapeutic agents or else by repeated intravenous injections of 1 or 2 ml. of a 10% aqueous solution to these agents.

As a non-limitative example of a composition according to the invention which may be administered orally in the form of tablets, there may be mentioned the following compositions:

|  | Mg. |
|---|---|
| 2-pyrrolidone | 400 |
| Starch | 61 |
| Polyvinylpyrrolidone | 8 |
| Talc | 26 |
| Magnesium stearate | 5 |

For the preparation of 10% aqueous solution which may be administered parenterally, one may proceed as follows: 10 g. of 2-pyrrolidone are dissolved in distilled water and the volume is adjusted to 100 ml.; the solution is filtered and 2 ml. vials are filled with this solution and sterilized by known means.

What I claim is:

1. A method for the treatment of motion sickness in a sufferer from said sickness which comprises internally administering to said sufferer an effective amount of γ-butyrolactam.

2. A method as claimed in claim 1 wherein said lactam is administered internally in a dosage of from about 100 to 2,000 mg. per day.

3. A method as claimed in claim 1 wherein said lactam is administered orally in the form of tablets containing from about 100 to 500 mg. of the active therapeutical ingredient and solid non-toxic, orally ingestable pharmaceutical carrier.

4. A method as claimed in claim 1 wherein said lactam is administered parenterally in the form of 10% aqueous solution.

5. A method as claimed in claim 1 wherein said lactam is administered rectally in the form of suppositories.

References Cited

Chemical abstracts, vol. 57, entry 15748b, 1962 citing Renner et al., Acta. Univ. Carolinate, Med. 1959, pp. 153–61.

(Other references on following page)

Chemical abstracts, vol. 61, entry 3600e, 1964, citing Bernard et al. Prom. Toksikol, i Klinica Prof. Zabalevanii Khim. et al. 1962, 133–4.

Chemical abstracts, vol. 61, entry 7595h, 1964 citing Bashicov, Gigiena i. Sanit. 29 (4) 42–6, (1964).

Hawkins, Clinica Chimica Acta, vol. 2, pp. 481–484, 1957.

Lightowler et al., Arch. Int. Pharmacodyn, vol. 145, No. 1–2, pp. 233–242, 1963.

Perhsin et al., Zh. Microbral., Epidemial. i. Immunobiol., vol. 41, No. 3, pp. 109–114, 1964.

R. HUFF, *Primary Examiner.*

LEWIS GOTTS, *Assistant Examiner.*